UNITED STATES PATENT OFFICE.

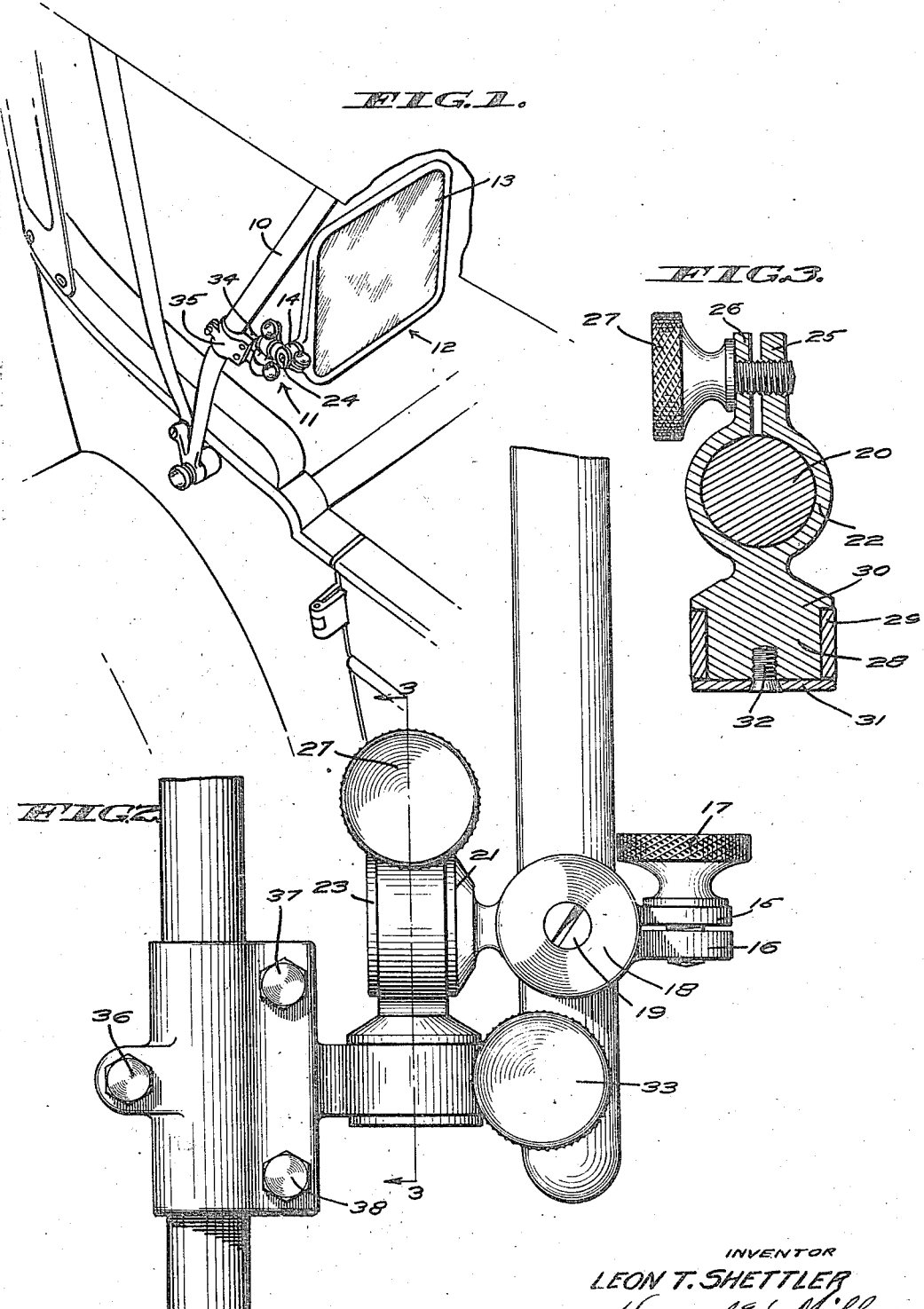

LEON T. SHETTLER, OF LOS ANGELES, CALIFORNIA.

UNIVERSAL WIND-SHIELD.

1,268,773.

Specification of Letters Patent.   Patented June 4, 1918.

Application filed December 22, 1916.  Serial No. 138,332.

*To all whom it may concern:*

Be it known that I, LEON T. SHETTLER, a citizen of the United States, residing at Los Angeles, in the county of Los Angeles and State of California, have invented new and useful Improvements in Universal Wind-Shields, of which the following is a specification.

This invention relates to a wind-shield and particularly pertains to an adjustable wind-shield adapted to be mounted upon automobiles, and to a mounting therefor.

It is the principal object of this invention to provide a wind-shield which may be readily disposed in convenient relation to a vehicle passenger and in a manner to properly shield him from the wind.

Another object of this invention is to provide an adjustable mounting for such a wind-shield so that it is possible to universally position the shield in a manner to shield the passenger from side currents of air as well as currents caused by the movement of the vehicle.

Another object is to provide means whereby the wind-shield may be readily and detachably secured to the vehicle without the addition of mounting brackets.

Another object of this invention is to provide a universal joint mounting for the wind-shield which affords positive adjustment for the shield and permits it to be set at any angle of vertical or horizontal inclination.

It is a further object of this invention to provide a wind-shield and mounting therefor which are compact in their design and which may be readily removed when their use is not desired and stored away in a convenient storage compartment.

Other objects will appear hereinafter.

The invention is illustrated, by way of example, in the accompanying drawings in which:

Figure 1 is a view in perspective illustrating a fragmentary view of a vehicle and its top and particularly disclosing the application of the wind-shield thereto.

Fig. 2 is an enlarged view in side elevation disclosing the construction of the universal joint by which the wind-shield is supported.

Fig. 3 is a view in vertical section as seen on the line 3—3 of Fig. 2 and illustrates the vertical and horizontal pivots incorporated within the universal joint and the manner of clamping same.

Referring more particularly to the drawings, 10 indicates one of the bows of a vehicle top upon which is clamped a universal joint mechanism 11 adapted to support a wind-shield 12. The wind-shield as here shown is rectangular in shape and fitted with a window of glass or other transparent material mounted within a suitable frame 13. This frame is preferably of metal and is formed with an outwardly extending side stud which is rotatably mounted within a bearing 14. This bearing is split and is fitted with clamping ears 15 and 16) which extend horizontally and in spaced relation to each other. These ears are drawn together by means of a knurled headed clamping screw 17 which binds the bearing around the wind-shield pivot pin and permits the wind-shield to be vertically swung and locked. A washer 18 is fitted against the outer end of the bearing 14 and is secured to the wind-shield pivot pin by means of a screw 19 which thus prevents lateral movement of the shield. The bearing 14 is formed integral with a pivot member 20 which is in horizontal alinement therewith and has its axis at right angles thereto. This member is cylindrical and fitted with a collar 21 adjacent the bearing 14. The portion 20 extends from this collar and passes through a vertically disposed bearing member 22 where it is retained by means of a washer 23 suitably held by a screw 24. The vertical bearing 22 is split and is formed with clamping jaws 25 and 26 which are in spaced relation to each other and are fitted with a clamping screw 27 which permits the bearing to be clamped rigidly around the pivot member 20 and thus fixes the vertical swinging movement of the wind-shield. As a means for permitting the wind-shield to move throughout a given horizontal plane, the bearing 22 is provided with a vertically disposed stud 28 which extends downwardly and is rotatably secured within a horizontal bearing ring 29. The stud 28 is formed with a collar 30 around its upper end which bears upon the bearing ring 29 and maintains it in its supported position. A washer 31 is secured by a screw 32 to the stud 28 beneath the bearing ring 29 and prevents the stud from being removed from the ring. The ring 29 is split and formed with a pair of ears through which a set screw 33 extends and by which the stud 28 is clamped in any position.

The ring 29 is formed integral with one of a pair of clamping jaws 34 and 35 by which the entire device is removably clamped upon the bow of a vehicle top. The jaw 34 to which the ring is secured is provided with a semi-circular portion which partially encircles one side of the top bow. This jaw is also provided with an ear which is in register with a similar ear upon the jaw 35 and permits the two jaws to be clamped together by means of a clamping screw 36. In order to permit the jaws to be adapted for use upon top bows of various sizes, a pair of cap screws 37 and 38, are provided to adjustably hold the clamping jaws together adjacent the ring 29. As these screws are manipulated the jaws may be separated and thereafter clamped by the screw 36.

When it is desired to mount the wind-shield upon a vehicle, the screw 36 is removed and the screws 37 and 38 are loosened until the jaws 34 and 35 may be passed around the vehicle top bow 10, after which the screws 37 and 38 are re-adjusted to permit the arcuate faces of the jaws to conform to the contour of the bow. When this has been accomplished the screw 36 may be replaced through its ears and thereafter drawn to rigidly clamp the jaws upon the bow. The wind-shield may then be swung throughout a horizontal plane upon the stud 28 within the ring 29, and may be vertically adjusted by being swung upon the pivot member 20 within the vertical bearing member 22. The exact vertical angular position of the wind-shield may thereafter be determined by swinging the shield directly upon its stud which is horizontally secured within the bearing 14. After the exact position has been attained the wind-shield may be locked by tightening set screws 17, 27 and 33. It will be understood that the clamping device may be mounted upon other fixed members than the top bows.

It will thus be seen that the wind-shield and mounting here disclosed and described are simple in construction and lend themselves to be readily adjusted in a universal manner so that the wind-shield will be exactly positioned in a desirable manner to shield the occupant of the vehicle from objectionable air currents irrespective of their direction of movement.

While I have shown the preferred construction of my universally mounted wind-shield, as now known to me, it will be understood that various changes in the combination, construction and arrangement of parts may be made by those skilled in the art without departing from the spirit of my invention.

I claim:

An adjustable wind-shield for vehicles comprising a pair of clamping jaws adapted to be detachably secured upon a fixed member upon a vehicle, a tubular bearing fixed to one of said jaws with its central opening vertically disposed, a pin extending downwardly through said opening and adapted to rotate therein, an eye formed integral with said pin and extending upwardly therefrom, a second pin extending through the eye and rotatably secured therein, an eye formed upon said second pin, a wind-shield provided with a horizontally extending pin extending through said last-named eye, whereby the wind-shield may have universal vertical movement in relation to its fixed support and simultaneous horizontal movement therearound, and means for clamping the shield in its adjusted position.

In testimony whereof I have signed my name to this specification.

LEON T. SHETTLER.